United States Patent
Höhn et al.

(10) Patent No.: US 6,297,344 B1
(45) Date of Patent: Oct. 2, 2001

(54) HEAT-SETTING SINGLE-COMPONENT LVA (LOW VISCOSITY ADHESIVE) SYSTEM FOR BONDING IN THE MICRO-RANGE

(75) Inventors: Klaus Höhn, Taufkirchen; Heiner Bayer, Olching, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/230,310

(22) PCT Filed: Jun. 16, 1997

(86) PCT No.: PCT/DE97/01504

§ 371 Date: Jan. 22, 1999

§ 102(e) Date: Jan. 22, 1999

(87) PCT Pub. No.: WO98/03605

PCT Pub. Date: Jan. 29, 1998

(30) Foreign Application Priority Data

Jul. 23, 1996 (DE) .............................. 196 29 750

(51) Int. Cl.[7] .............................. C08K 5/05; C08K 5/053; C08K 3/36; C08L 63/00
(52) U.S. Cl. .......................... 528/90; 523/456; 523/466; 523/467; 525/107; 525/523; 528/92
(58) Field of Search ........................ 528/90, 92; 523/456, 523/466, 467; 156/330; 525/107, 523

(56) References Cited

U.S. PATENT DOCUMENTS

| | | | |
|---|---|---|---|
| 4,216,288 | * 8/1980 | Crivello | 528/90 |
| 4,480,059 | 10/1984 | Dudgeon | 523/466 |
| 4,482,679 | * 11/1984 | Irving | 528/89 |

FOREIGN PATENT DOCUMENTS

| | | |
|---|---|---|
| 30 08 497 | 9/1980 | (DE) . |
| 211120 | * 7/1984 | (DE) . |
| 0 245 018 | 11/1987 | (EP) . |
| 527107 | * 2/1993 | (EP) . |
| WO 92/20754 | * 11/1992 | (WO) . |

OTHER PUBLICATIONS

Chemical abstracts registry No. 26376–86–3 for Modaflow or ethyl acrylate/2–ethylhexyl acrylate copolymer, 1975.*
Chemical abstracts registry No. 87301–55–1 for benzyltetramethylsulfonium hexafluoroantimonate, 1975.*
Maruno et al., "Properties of a UV–curable, durable precision adhesive," Journal of Adhesive Science and Technology, (1995) vol. 9, No. 10, pp. 1343–1355.*

* cited by examiner

Primary Examiner—Robert E. L. Sellers
(74) Attorney, Agent, or Firm—Schiff Hardin & Waite

(57) ABSTRACT

A composition comprises from 60–98 weight percent of a casting resin such as an epoxy resin, from 2–30 weight percent of an alcohol or sugar such as 3 (4), 8 (9)-bis (hydroxymethyl)tricyclo[$5.2.1.0^{2,6}$]decane, from 0.2 to 2.0 weight percent of a thermal initiator such as an onium salt, from 0.2–2.0 weight percent of a bonding agent such as 3-glycidyloxypropyltrimethoxysilane, from 0–3.0 weight percent of a flow improver, from 0.2–5.0 weight percent of a metal complex with an organic ligand such as an amino acid, acetate, carbonic acid, amine and acetylacetonate including zinc di-(2-ethylhexanoate) and from 0–4 weight percent of a thixotropic agent and/or a flow modifier.

9 Claims, No Drawings

HEAT-SETTING SINGLE-COMPONENT LVA (LOW VISCOSITY ADHESIVE) SYSTEM FOR BONDING IN THE MICRO-RANGE

BACKGROUND OF THE INVENTION

The invention relates to a casting resin system with improved storage characteristics, The casting resin system is suitable for the formation of glued bonds with dimensional tolerances in the micrometer and sub-micrometer ("$\mu$m and sub-$\mu$m") region (smaller than 1 $\mu$m)

From Assignee internal patent application docket number 94 E 1887 (official file number not yet known), whose content is hereby incorporated by reference, a thermally hardenable single-component adhesive system is known that achieves an increase in viscosity in long-term storage, i.e. for example, storage of six months or longer. An increase in viscosity leads to modified runoff and flow characteristics of the adhesive system, which make dosing precision difficult. In particular, in the application of small quantities of adhesive in micro-gluing technology, these effects then often cause problems that make a reproducible adhesive application more difficult for mass production, e.g. in the field of microoptics. For the inhibition of the initiators contained in the mixture, these adhesive systems often have basic additives. In addition, the (often volatile) basic additives can lead during processing to odor annoyances that are harmful to health, and have an adverse effect on the hardening reaction in the gluing, above all in thinner layers.

There is thus a need for adhesive systems in which the basic additives can be omitted, and which have an improved storage stability with respect to the receipt of their low viscosity, i.e. their viscosity remains almost unchanged over the storage period.

SUMMARY OF THE INVENTION

It is thus all object of the present invention to provide an adhesive system that can do without basic additives and has improved storage stability with respect to its low viscosity.

The general recognition of the invention is that the addition of small quantities of metal complex compound, advantageously zinc complexes, to the known adhesive systems has the effect that the adhesive systems retain their low viscosity for a considerably longer time during storage in the refrigerator (at approx. 5° C. to 8° C.).

The subject matter of the present invention is a thermally hardenable single-component adhesive system. The adhesive system includes the following components:
60–98% weight percent of a casting resin
2–30 weight percent of an alcohol or a sugar,
0.2–2.0 weight percent of a thermal initiator,
0.2–2.0 weight percent of a bonding agent and/or
0–3.0 weight percent of a flow improver and/or
0–4 weight percent of a thixotropic agent and/or of a flow modifier, and
0.2–5.0 weight percent of a metal complex compound.

In addition, the subject matter of the present invention is the use of the adhesive system for the formation of adhesives with dimensional tolerances in the $\mu$m and sub-$\mu$m region.

DETAILED DESCRIPTION OF THE PRESENTLY PREFERRED EMBODIMENTS

The present invention provides an adhesive system with improved storage stability. The inventors have discovered that the addition of a metal complex compound to known adhesive systems allows for the retention of low viscosity for considerably longer times during storage. As a result, the adhesive system of the present invention can be used unproblematically, even after long periods of storage, for microdosing technology.

Pursuant to the present invention, the adhesive system includes a casting resin, an alcohol or a sugar, a thermal initiator, a bonding agent and a metal complex. In a preferred embodiment, the casting resin is an epoxy casting resin and the alcohol is a multivalent alcohol. Still further, the adhesive of the present invention can also include known additives that thereby provide additional characteristics to the adhesive.

In the present invention, "casting resin" is understood to mean thermally hardenable resin systems and reaction resins that are of such low viscosity that by means of casting they can be brought into a corresponding shape in which they can then be hardened thermally, i.e. by means of temperature increase with the presence of suitable additives i.e., initiators, accelerators, and other components). According to the invention, a preferred casting resin is epoxy casting resin. In the inventive formulation, the casting resin is contained in a quantity of 60–98 weight percent, advantageously in a quantity of 75 to 95 weight percent, preferably between 80 and 95 weight percent, and particularly preferably in the range from 85 to 93 weight percent.

As an "epoxy casting resin," cycloaliphatic epoxy resins can be used, such as the resin CY177 available from— therefor Ciba Geigy (a bis3,4-epoxycyclohexylmethyl)-adipate or the resin CY179, likewise of available from Ciba Geigy (a 3,4-epoxycyclohexylmethyl-3', 4'-epoxycyclohexane carboxylate). In addition, linear aliphatic epoxy resins, e.g. epoxied polybutadiene or epoxied soybean oil, are suitable for use in the present invention. Other cationically hardening resins, such as vinyl ether or vinyl aromates, are likewise suitable. In addition, epoxy resins of the glycidylether type are suitable. The following can serve as a basis for the glycidylether: bisphenols (e.g. bisphenol A,) di- or polyhydroxyaromates, (e.g. resorcin,) polyarylalkyls with phenolic OH groups, novolaks, polyalkylene glycols or also multiple alcohols (e.g. butane diol, hexane diol, glycerine or pentaerythritol). In addition, glycidylether ester-type compounds are suitable, (e.g. parahydroxybenzoic acid-glycidylether ester); pure glycidyl ester of multiple carbon acids with aliphatic or aromatic core (e.g. hexahydrophthalic acid or phthalic acid).

According to the invention, alcohols with 1–15 hydroxy groups or sugar are used as "alcohols or sugar." Preferably, alcohols with 1 to 5 hydroxy groups are used. The skeletal structure of the alcohol or sugar can thereby vary arbitrarily. It can be aliphatic, cyclic or bicyclic. It can consist only of single bonds or also of multiple bonds, and can also be an aromatic system. Among others, the TCD alcohol DM available from of the Hoechst company is preferably used, which is a 3(4),8(9)bis(hydroxymethyl)tricyclo[$5.2.1.0^{2,6}$] decane. The (preferably multivalent) alcohol is contained in the adhesive formulation with a mass portion between 2 and 30 weight percent. It preferably has a mass portion between 2.5 and 20 weight percent, particularly preferably a portion between 4.5 and 12 weight percent.

As a thermal initiator, all standard initiators that harden according to a cationic mechanism, e.g. onium salts, can be used. Here S-benzylthiopheniumhexaflouroantimonate of the Aldrich company, is preferably used.

As a bonding agent, A187 available from the Huls company is used, which is a 3-glycidyloxypropyltrimethoxysilane.

As a flow improver, Modaflow (Monsanto company), which is a copolymer of ethyl acrylate and 2-ethylhexyl acrylate, can be used, and as flow modifiers or thixotropic agents, the commercially available aerosil types of the Degussa company can, for example, be used.

As metal complex compounds, $Zn^{2+}$ compounds or other metal complexes of transition metals can preferably be used. Suitable metal compounds for use in the metal complexes include:

zircon, iron, cobalt, titanium, nickel, molybdenum and manganese, or tin, magnesium or aluminum, as well as rare earths such as cerium.

"To make the metal complex compounds, such metal compounds are combined" with standard organic ligands, such as amino acids, acetate, general carbonic acids, amines and acetylacetonates, etc. The added quantities of zinc complex compound is between 0.2 and 5 weight percent, preferably less than 3 weight percent. The added quantity is particularly preferably less than 1 weight percent.

Besides the components already stated, further known additives can also be contained in the inventive adhesive system. As a result, the adhesive systems also receive additional characteristics, such as a particular color or transparency, as well as flame retardance or heat resistance. Additives in this sense can thus be, for example, dyes, pigments, flow modifiers, general stabilizers, fire protection agents, or mineral or other filling materials. It is thereby almost always possible to achieve particular characteristics by means of additives, e.g. selective absorption or transparency by the additional of a dye.

The manufacturing of the adhesive system takes place in standard fashion. The formulation components, such as the epoxy resin, the multivalent alcohol, the thermal initiator, the adhesive agent and the metal complex are mixed uniformly with one another. In an embodiment, such mixing can also occue at moderately increased temperatures and with solvents that can be removed. For the manufacture of the adhesive system, it is thus possible to make use of standard methods known to be reliable from the prior art.

EXAMPLES

By way of example, and not limitation, the invention now explained in more detail on the basis of an embodiment.

Table 1 shows the formulation components of representative adhesive systems. Of the four adhesive systems indicated, 2 (those marked with an asterisk *) contain, according to the invention, a zinc complex (HK170* and HK 191*), and two other comparison systems are without zinc complex and correspond to the prior art (HK 170 and HK 191).

TABLE 1

Components and chemical designation of the formulations

| Component (reference source), chemical designation | HK170 [MT] | HK170* [MT] | HK191 [MT] | HK191* [MT] |
|---|---|---|---|---|
| Resin: | | | | |
| CY177 (Ciba Geigy), | 100 | 100 | | |
| bis(3,4-epoxycyclohexylmethyl)-adipate | | | | |
| CY 179 (Ciba Geigy), 3,4-epoxy-cyclo-hexylmethyl- 3',4'-epoxy-cyclohexanecarboxylate | | | 90 | 90 |
| Multivalent alcohol: | | | | |
| TCD alcohol DM (Hoechst), 3(4),8(9)-bis(hydroxymethyl)-tricyclo [5.2.1.0$^{2,6}$]decane | 5 | 5 | 10 | 10 |
| Thermal initiator: | | | | |
| S-benzylthiolaniumhexafluoroantimonate (Aldrich) | 0.5 | 0.5 | 0.8 | 0.8 |
| Adhesive agent: | | | | |
| A187 (Hüuls) 3-glycidyloxypropyltrimethoxysilane | 0.5 | 0.5 | 0.5 | 0.5 |
| Zinc complex: | | | | |
| L230 (Bärlocher company) Di-(2-ethylhexanoate)zinc | | 0.4 | | 0.5 |

The compounds indicated in Table 1 were then subjected to a long-term experiment. The storage stability of the adhesive systems containing a zinc complex and not containing a zinc complex was thereby compared at a storage temperature of 8° C. In the case of HK 170, the initial viscosity of 120 mPas (measurement of the viscosity at 60° C.) increases to 200 mPas after 6 months storage. For HK 170* with 0.4 weight percent L 230 zinc complex additive it however increases only to 140 mPas within a year. Thus after twice the timeout with conditions that are otherwise the same, recognized improvements are seen with the composition of the present invention. Specifically for the example of the compounds HK 170 and HK 170*, it is thus to be recognized that the viscosity of the compound without the zinc complex has already increased more after 6 months than the viscosity of the adhesive system containing the zinc complex after 12 months. It can thereby be shown that even given a quantity of additive as small as 0.4 weight percent zinc complex, a clear increase in the storage stability of the formulations is effected. Moreover, the hardening behavior of the formulations on substrates, such as glass, PA (polyamide), PPA (polyphthalamide), PMMA (polymethylmethacrylate) and PP (polypropylene), is not adversely affected by the addition of zinc complex.

DSC (DSC=differential scanning calorimetry) investigations were carried out that indicate that the modified casting resin systems comprise slightly higher onset temperatures. However, the hardening behavior at the standard hardening temperatures of 120° C. is not essentially affected thereby (Table 2).

TABLE 2

Selected DSC characteristic data:

|  | HK 191 | HK 191 |
| --- | --- | --- |
| T-onset [° C.] | 129 | 142 |
| T-peak [° C.] | 146 | 161 |
| $\Delta H_R$ [-J/g] | 564 | 546 |
| Residual reaction [%] after 30 min 120° C. | 15.0 | 18.6 |

With the inventive adhesive system, an automated and reliable micro-dosing of electronic and optoelectronic components is possible in the μm and sub-μm region. The inventive single-component epoxy resin with zinc complex does not harden immediately, so that the addition of the individual components is permitted up until the fixing occurs. The epoxy resin components, as well as the overall adhesive system, is sufficiently low in viscosity to be used in micro-gluings. Thanks to the addition of zinc complex, no odor annoyance will occur due to vaporization of basic additives, even during the processing of the adhesive system. The adhesive formulation is stable in storage for 12 months at a refrigerator temperature of 8° C., without significant increase of the viscosity. This achievement of low viscosity has the result that the inventive adhesive system, in contrast to the adhesives of the prior art, can be used unproblematically even after longer storage, in particular for microdosing technology.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A single-component adhesive system thermally hardenable by a cationic mechanism comprising:
   60 to 98 weight percent of an epoxy casting resin;
   2 to 30 weight percent of a multivalent alcohol, said multivalent alcohol being 3(4),8(9)-bis (hydroxymethyl) tricyclo [$5.2.1.0^{2,6}$] decane;
   0.2 to 2.0 weight percent of a thermal initiator;
   0.2 to 2.0 weight percent of a bonding agent;
   0 to 3.0 weight percent of a flow improver;
   0 to 4.0 weight percent of a thixotropic agent;
   0 to 4.0 weight percent of a flow modifier other than the thixotropic agent; and
   0.2 to 5.0 weight percent of a $Zn^{+2}$ complex.

2. The adhesive system of claim 1 wherein the epoxy casting resin is a bis(3,4-epoxycyclohexylmethyl) adipate or 3,4-epoxycylcohexylmethyl-3',4'-epoxycylcohexanecarboxylate.

3. The adhesive system of claim 1 comprising:
   85 to 93 weight percent of the casting resin;
   4.5 to 12 weight percent of the alcohol;
   0.7 to 1.0 weight percent of the thermal initiator;
   0.3 to 0.6 weight percent of the bonding agent;
   0 to 1.5 weight percent of a flow improver;
   0 to 2.0 weight percent of a thixotropic agent;
   0 to 2.0 weight percent of a flow modifier; and
   0.5 to 2.0 weight percent of the $Zn^{+2}$ complex.

4. The adhesive system of claim 1 comprising:
   88.4 weight percent of the casting resin;
   9.82 weight percent of the alcohol;
   0.79 weight percent of the thermal initiator;
   0.49 weight percent of the bonding agent; and
   0.49 weight percent of the $Zn^{+2}$ complex.

5. A single-component adhesive system thermally hardenable by a cationic mechanism comprising:
   60 to 98 weight percent of an epoxy casting resin;
   2 to 30 weight percent of a multivalent alcohol, said multivalent alcohol being 3(4),8(9)-bis (hydroxymethyl) tricyclo [$5.2.1.0^{2,6}$] decane;
   0.2 to 2.0 weight percent of a thermal initiator;
   0.2 to 2.0 weight percent of a bonding agent;
   0 to 3.0 weight percent of a flow improver;
   0 to 4.0 weight percent of a thixotropic agent;
   0 to 4.0 weight percent of a flow modifier other than the thixotropic agent; and
   0.2 to 5.0 weight percent of a $Zn^{+2}$ complex, the $Zn^{+2}$ complex being di-(2-ethylhexanoate)zinc.

6. A method for forming precision glued bonds with dimensional tolerances in the micrometer and sub-micrometer region, the method comprising the steps of:
   providing a thermally hardenable single-component adhesive system comprising:
      60 to 98 weight percent of an epoxy casting resin;
      2 to 30 weight percent of a multivalent alcohol, the multivalent alcohol being 3(4), 8(9)-bis (hydroxymethyl) tricyclo [$5.2.1.0^{26}$] decane;
      0.2 to 2.0 weight percent of a thermal initiator;
      0.2 to 2.0 weight percent of a bonding agent; and
      0.2 to 5.0 weight percent of a $Zn^{+2}$ complex compound;
   dosing the adhesive system onto components to be connected; and
   thermally hardening the adhesive system.

7. The method of claim 6 wherein the components are electronic or optoclectronic components.

8. A method according to claim 6, wherein the epoxy casting resin is selected from a group consisting of a bis(3,4-epoxycyclohexylmethyl) adipate and 3,4-epoxycylcohexylmethyl-3',4'-epoxycylcohexanecarboxylate.

9. A method according to claim 6, wherein the $Zn^{+2}$ complex is di-(2-ethylhexanoate)zinc.

* * * * *